(12) United States Patent
Ali-Tolppa et al.

(10) Patent No.: US 11,671,308 B2
(45) Date of Patent: Jun. 6, 2023

(54) DIAGNOSIS KNOWLEDGE SHARING FOR SELF-HEALING

(71) Applicant: Nokia Solutions and Networks Oy, Espoo (FI)

(72) Inventors: Janne Tapio Ali-Tolppa, Pirkkala (FI); Benedek Schultz, Budapest (HU); Márton Kajó, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 88 days.

(21) Appl. No.: 17/290,175

(22) PCT Filed: Oct. 30, 2018

(86) PCT No.: PCT/EP2018/079735
§ 371 (c)(1),
(2) Date: Apr. 29, 2021

(87) PCT Pub. No.: WO2020/088747
PCT Pub. Date: May 7, 2020

(65) Prior Publication Data
US 2021/0392031 A1   Dec. 16, 2021

(51) Int. Cl.
*H04L 41/0631* (2022.01)
*H04L 41/0654* (2022.01)
*H04L 41/12* (2022.01)
*H04L 41/14* (2022.01)
*H04L 41/5009* (2022.01)
*H04W 24/04* (2009.01)
(Continued)

(52) U.S. Cl.
CPC .......... *H04L 41/064* (2013.01); *H04L 41/065* (2013.01); *H04L 41/0654* (2013.01);
(Continued)

(58) Field of Classification Search
CPC . H04L 41/064; H04L 41/065; H04L 41/0654; H04L 41/12; H04L 41/145;
(Continued)

(56) References Cited

U.S. PATENT DOCUMENTS

2016/0350173 A1* 12/2016 Ahad ..................... H04L 67/02
2016/0381580 A1   12/2016 Kwan
(Continued)

OTHER PUBLICATIONS

Bodrog et al., "A Robust Algorithm for Anomaly Detection in Mobile Networks", IEEE 27th Annual International Symposium on Personal, Indoor, and Mobile Radio Communications (PIMRC), Sep. 4-8, 2016, 6 pages.

(Continued)

*Primary Examiner* — David R Lazaro
*Assistant Examiner* — Zia Khurshid
(74) *Attorney, Agent, or Firm* — Nokia Solutions and Networks Oy

(57) ABSTRACT

According to an aspect, there is provided a local diagnosis system comprising means for performing the following. The local diagnosis system detects one or more anomaly events associated with a communications network. Each anomaly event defines an anomaly pattern describing a data point in a performance indicator space. Then, the local diagnosis system updates one or more local cluster models to incorporate the one or more anomaly patterns within complexity constraints. Each of the one or more local cluster models corresponds to a different diagnosis label defining a diagnosis. In response to failing according to one or more per-defined criteria to incorporate, in the updating, the one or more anomaly patterns to the one or more local cluster models, the local diagnosis system forwards at least the one or more local cluster models and one or more associated diagnosis labels to a central diagnosis system for further diagnosis.

18 Claims, 11 Drawing Sheets

(51) Int. Cl.
*H04W 24/08* (2009.01)
*H04W 24/10* (2009.01)

(52) U.S. Cl.
CPC ............ *H04L 41/12* (2013.01); *H04L 41/145* (2013.01); *H04L 41/5009* (2013.01); *H04W 24/04* (2013.01); *H04W 24/08* (2013.01); *H04W 24/10* (2013.01)

(58) Field of Classification Search
CPC ............. H04L 41/5009; H04L 41/0672; H04L 41/142; H04W 24/04; H04W 24/08; H04W 24/10
USPC .......................................................... 709/224
See application file for complete search history.

(56) References Cited

U.S. PATENT DOCUMENTS

2018/0083833 A1* 3/2018 Zoll ...................... G06F 16/215
2018/0129726 A1 5/2018 Park et al.
2018/0144815 A1* 5/2018 Chapman-McQuiston ................. G16H 50/30

OTHER PUBLICATIONS

Ciocarlie et al., "Diagnosis Cloud: Sharing Knowledge Across Cellular Networks", 12th International Conference on Network and Service Management (CNSM), Oct. 31-Nov. 4, 2016, pp. 228-232.
Kajo et al., "Equal-Volume Quantization of Mobile Network Data Using Bounding Spheres and Boxes", NOMS 2018—2018 IEEE/IFIP Network Operations and Management Symposium, Apr. 23-27, 2018, 9 pages.
Bodrog et al., "Demonstrator of KPI Analytics for Anomaly Detection and Diagnosis in Mobile Networks", International Symposium on Personal, Indoorand Mobile Radio Communications, 2017, 3 pages.
International Search Report and Written Opinion received for corresponding Patent Cooperation Treaty Application No. PCT/EP2018/079735, dated Apr. 4, 2019, 12 pages.

* cited by examiner

DIAGNOSIS KNOWLEDGE SHARING FOR SELF-HEALING

RELATED APPLICATION

This application was originally filed as Patent Cooperation Treaty Application No. PCT/EP2018/079735 filed Oct. 30, 2018, each of which is incorporated herein by reference in its entirety.

TECHNICAL FIELD

Various example embodiments relates to wireless communications.

BACKGROUND

Self-healing may be implemented in self-organizing networks. The goal of self-healing is to automatically detect and correct problems that spring up in a self-organizing network during its operation. This may be achieved by monitoring data associated with the self-organizing network, detecting any anomalies in said data and autonomously reacting to the detected anomalies with corrective or mitigating actions.

While the detection of anomalies may be automated in a conceptually straight-forward way, the automated diagnosis of the anomalies is typically much harder due to the less-constrained problem formulation, accentuated by the distributed and heterogeneous nature of mobile networks. As diverse as fault states may be, they occur only in very rare cases, which may make it impossible to collect statistically meaningful data set for each case. The lack of statistical samples makes the reliable root-cause analysis extremely difficult and the collection and maintenance of the knowledgebase is tedious and expensive at best. Therefore, a new type of solution is needed to achieve reliable diagnoses in an automatized manner.

BRIEF DESCRIPTION

According to an aspect, there is provided the subject matter of the independent claims.

Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UT-RAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile adhoc networks (MANETs) and Internet Protocol multimedia subsystems (IMS) or any combination thereof.

Figure 1:
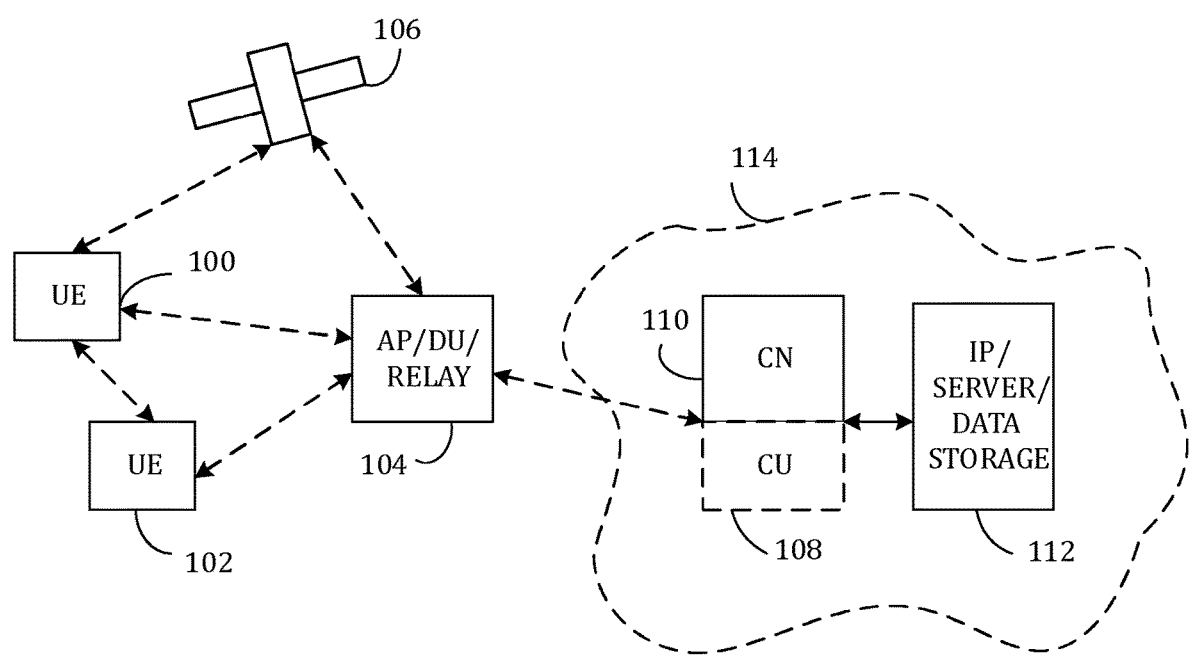
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be nonexistent. Some other technology advancements probably to be used are Big Data and all-IP, which may change the way networks are being constructed and managed. 5G (or new radio, NR)

networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Self-organizing networks is a concept first implemented in LTE communications systems and later retro-fitted also to older radio access technologies such as UMTS. Self-organizing networks are to be implemented also in 5G communication systems. A self-organizing network (SON) is an automation technology solution designed to make the planning, configuration, management, optimization and healing of mobile radio access networks simpler and faster. The use of self-organizing networks provides, for example, the benefits of reducing the level of human intervention in network design, build and operation, optimizing the use of available resources and reducing the number of human errors.

The operation of self-organizing networks may be divided into four distinct areas: self-organizing, self-configuration, self-optimization and self-healing. The embodiments to be discussed below relate specifically self-healing by self-organizing network. During the normal operation of a communications network, said communications network will likely develop problems or faults over time. The goal of self-healing processes is to automatically detect and correct problems in the communications network. These functionalities may be achieved by monitoring the Performance Management (PM), Fault Management (FM) and Configuration Management (CM) data and autonomously reacting to any detected degradations with corrective or mitigating actions. Often this is done on Network Management (NM) level, where a wider overview of the network is available, and detected anomaly events may be correlated over the whole network. The advantage of such anomaly detection compared to Fault Management monitoring is that it can offer additional resiliency in the system against unforeseen problems. While Fault Management alarms cover many of the recognized network faults, machine learning based anomaly detection methods may profile and learn the normal behavior for each context, e.g., for each network function, and detect even completely unforeseen deviations from it. Such a function can enable a more sensitive detection system, by detecting issues where no explicit alarm is generated, or it can detect anomalies before an alarm is raised and a severe problem occurs. Sensitivity does not however equate to oversensitivity. Machine-learning-based detection is also able to mitigate false detections by correlating information from multiple network elements.

The self-healing process may be divided into two phases: anomaly detection and anomaly diagnosis. The anomaly detection may be carried out by comparing the current performance to an established profile that describes the normal behavior of a communications network. The profiles may be created from performance measurements of a set period, and can be updated either periodically or continuously to combat profile aging and create resilience against false detections stemming from slow, trend-like changes in network behavior. The profiling and detection may be carried out based on a set of selected features, e.g., PM Key Performance Indicators (KPIs), the composition of which depends on the types of problems that are to be detected. Based on the anomaly levels of each of the features, distinct anomaly events, likely having the same root cause, are detected and aggregated both temporally and spatially. A detected anomaly event means only that the system is in an unusual, anomalous state, but not necessarily that this state corresponds to degradation (or any other interesting event).

To further the understanding of the phenomena, anomaly diagnosis needs to be performed to analyze the anomaly event and determine its root cause. The embodiments to be discussed below concern specifically the anomaly diagnosis part of the self-healing process.

While the detection of anomalies may be automated in a conceptually straightforward way, the automated diagnosis of the anomalies is typically much harder due to the less-constrained problem formulation, accentuated by the distributed and heterogeneous nature of mobile networks. As diverse as fault states may be, they occur only in very rare cases, which makes it impossible to collect statistically meaningful data set for each case. The lack of statistical samples makes the reliable root-cause analysis extremely difficult and the collection and maintenance of the knowledgebase is tedious and expensive at best. Therefore, a new type of solution is needed to achieve reliable diagnoses in an automatized manner. Such a solution would be especially important in cases, where new network functions are introduced in the network, or even completely new networks are deployed. Equally, such capability is also a necessity in case of discontinuities, such as significant network function (software) upgrades, that often (at least partially) invalidate the already learned models.

There are several different ways for implementing the diagnosis part or function of a self-healing process. Conventionally, diagnosis rules are defined a priori by a human expert and stored in a database. The static rule-based diagnosis database obviously does not provide automatic diagnosis of unforeseen problems. Furthermore, collecting and maintaining the rule base is typically a laborious manual task. Instead of using static diagnosis rules, the embodiments are based on using Case-Based Reasoning (CBR). Case-based reasoning allows for a more dynamic collection and maintenance of the diagnosis knowledgebase (i.e., a diagnosis database). In case-based reasoning, the diagnosis of an anomaly event is achieved by conducting automated generalization and extrapolation from previous, similar examples of anomaly events. This functionality may be implemented by analyzing the (PM) anomaly pattern, which describes the characteristics of the anomaly event. The anomaly pattern may be compared against the anomaly patterns of already analyzed and labelled anomalies stored in the diagnosis knowledgebase (or specifically against statistical cluster models generated based on said anomaly patterns), and the root cause of the best matching already diagnosed anomaly is selected as the most likely root cause. The most probable root cause may be connected to a set of (possibly automated) corrective actions.

Figure 2:
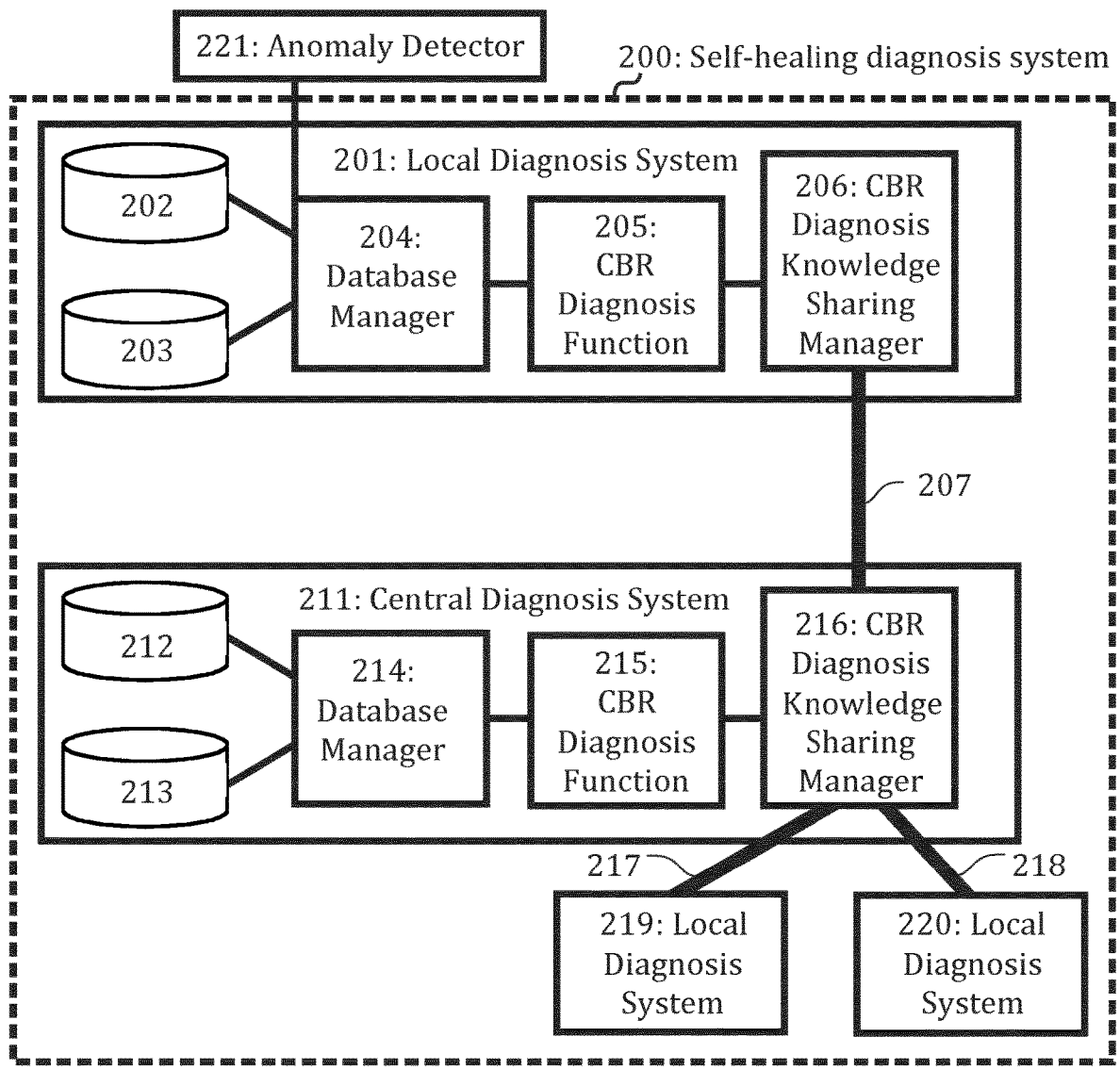
FIG. 2 illustrates an exemplified anomaly event diagnosis system based on transfer learning and case based reasoning according to embodiments.

FIG. 2 illustrates a self-healing diagnosis system 200 according to an embodiment for overcoming at least some of the problems described above by using so-called transfer learning in connection with the aforementioned case-based reasoning. In transfer learning, models are learned in one task and context, and are applied to another task or context. The self-healing diagnosis system 200 according to embodiments comprises at least a central diagnosis system 211 and one or more local diagnosis systems 201, 219, 220. The central diagnosis system 211 may be connected to said one or more local diagnosis systems 201, 219, 220 via one or more interfaces 207, 217, 218 to enable knowledge sharing and consequently transfer learning. In the illustrated example, three local diagnosis systems 201, 219, 220 and three corresponding interfaces 207, 217, 218 are shown with only the local diagnosis system 201 shown in more detail as an example. The other two illustrated local diagnosis systems 219, 220 may comprise the same elements as the local diagnosis system 201 and be also connected an anomaly detector system or entity similar to the anomaly detector system or entity 221 connected to the local diagnosis system 201. The systems 200, 201, 211, 219, 220, 221 may equally be called entities, apparatuses, agents or functions. Any of systems 200, 201, 211, 219, 220, 221 may equally be called entities, apparatuses, agents or functions. The self-healing diagnosis system 200 may be (fully or in part) a cloud computing or edge computing-based system.

The local diagnosis systems 201, 219, 220 may operate autonomously relative to each other and possibly in different contexts (e.g., in different network instances). The local diagnosis systems 201, 219, 220 may not be connected directly to each other but be connected only through the central diagnosis system 211. Each local diagnosis system 201, 219, 220 may be configured to diagnose anomalies or anomaly events relating to its specific context (or network instance) using case-based reasoning. The information on the anomaly events may be received by the local diagnosis system from a local anomaly detector system 221 configured to detect said anomaly events.

Each local diagnosis system 201, 219, 220 may comprise at least one or more databases 202, 203, a database manager 204, a CBR diagnosis function 205 and a CBR diagnosis knowledge sharing manager 206.

The one or more local databases 202, 203 may comprise, for example, at least one local anomaly event database comprising information on individual anomaly events and/or observations and/or at least one local diagnosis database comprising information on anomaly event clustering. Specifically, the information on anomaly event clustering may comprise one or more (statistical) local cluster models of clusters (or types of clusters) and one or more corresponding diagnosis labels for said one or more (statistical) local cluster models. A cluster may be defined, here and in the following, as a data structure comprising a plurality of (closely related or closely spaced) data points in a performance indicator space defined by a plurality of performance indicators of a communications network. Multiple clusters that cover a set of anomaly points may be called a clustering and thus a clustering model may be a joint model combining multiple cluster models. In some embodiments, one or more of the at least one local diagnosis database may be shared by two or more local diagnosis systems 201, 219, 220. While the one or more local databases 202, 203 are depicted in FIG. 2 as being comprised in the local diagnosis system 201, in other embodiments at least one of the one or more local databases 202, 203 may be a separate entity connected to the local diagnosis system 201 (or specifically to the database manager 204) via an interface.

The database manager 204 may be configured to provide direct access to the one or more local databases 202, 203 (e.g., comprising the local anomaly event and diagnosis databases) from outside and/or inside the local diagnosis system 201. The database manager 204 may be further configured to handle any mixing and sampling of anomaly events to and from the anomaly event database. The database manager 204 may provide access to the one or more local databases 202, 203, for example, to a user connected to the local diagnosis system 201 via a human-machine interface, e.g., using user equipment.

The CBR diagnosis function 205 acts as the main diagnosis module of the local diagnosis system 201. The operation of the CBR diagnosis function 205 is described in detail in relation to further embodiments.

The CBR diagnosis knowledge sharing manager 206 may be configured to manage queries from multiple knowledge sharing agents, systems or functions, route information coming from said agents, systems or functions and/or to stop an iterative sharing process. The CBR diagnosis knowledge sharing manager 206 may be connected via a knowledge sharing interface 207 to a central diagnosis system 211 (or specifically to a central CBR diagnosis knowledge sharing manager 216 of the central diagnosis system 211).

The central diagnosis system 211 may comprise similar elements as described in relation to the local diagnosis system, that is, at least one or more central databases 212, 213, a database manager 214 for managing said one or more central databases 212, 213, a CBR diagnosis function 215 and a CBR diagnosis knowledge sharing manager 216 for knowledge sharing via one or more knowledge sharing interfaces 207, 217, 218 to the one or more local diagnosis systems 201, 219, 220. Said elements may be configured to perform similar tasks as described for the corresponding elements of the local diagnosis system 201. However, while the local diagnosis systems 201, 219, 220 are configured to receive information of detected anomaly events from the local anomaly detector system 221, the central diagnosis system 211 may be configured to receive information on anomaly events from the one or more local diagnosis systems 201, 219, 220 via the one or more knowledge sharing interfaces 207, 217, 218. Specifically, the one or more local diagnosis systems 201, 219, 220 may be configured to forward information on local diagnosis results for a set of one or more anomaly events if the diagnosis results produced locally are not satisfactory (e.g., the confidence in the diagnosis is low). The one or more local diagnosis systems 201, 219, 220 may also be configured to forward information on one or more detected anomaly events. The central diagnosis system 211 may be configured to perform its own diagnosis based on the received information and forward the results back to the corresponding local diagnosis system. These process step may be repeated until satisfactory diagnosis is attained (i.e., the process may be iterative).

Similar to as described for the one or more local databases 202, 203, the one or more central databases 212, 213 may comprise, for example, at least one central anomaly event database comprising information on individual anomaly events and/or observations and/or at least one central diagnosis database comprising information on anomaly event clustering. The information on anomaly event clustering may be defined similar to above though the one or more central cluster models may be defined to be more general in nature compared to the corresponding one or more local cluster models. The information stored by the one or more central databases 212, 213 may have been gathered from all of the one or more local diagnosis systems 201, 219, 220. While the local diagnosis system may be configured to store information on each individual anomaly event detected locally in the local anomaly event database, the central diagnosis system may be configured not to store information on every single anomaly event that is submitted to it for evaluation by the one or more local diagnosis systems 201, 219, 220. Rather, the central diagnosis system may maintain a representative sample of a fixed size in the central anomaly event database, adding and removing points from it as new observations (i.e., anomaly patterns) arrive following an observation mixing and sampling method according to embodiments. While the one or more central databases 212, 213 are depicted in FIG. 2 as being comprised in the central diagnosis system 211, in other embodiments at least one of the one or more central databases 212, 213 may be separate entities connected to the central diagnosis system 211 (or specifically the database manager 214) via an interface.

Any of the local diagnosis systems and the central diagnosis system may enable a user (i.e., a human expert) to access the information stored to the databases 202, 203, 212, 213 and/or to modify said information and/or operation of any CBR diagnosis function via one or more human-machine interfaces (not shown in FIG. 2). For example, said one or more human-machine interfaces may be used to modify the diagnoses (i.e., statistical models of clusters) produced by any of the local diagnosis systems and/or the central diagnosis system. Specifically, said one or more human-machine interfaces may be used to modify one or more cluster models themselves (i.e., model parameters) including modifying the clustering associated with said one or more cluster models (e.g., merging and/or splitting cluster models) and/or diagnosis labels associated with said one or more cluster models.

Figure 3:
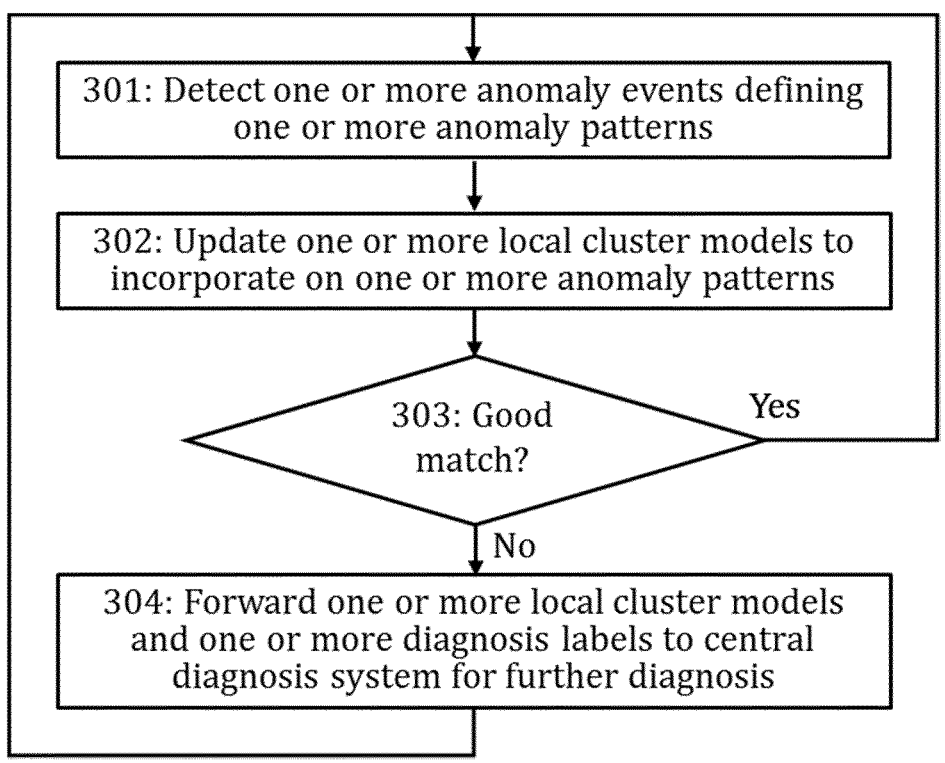
FIGS. 3 to 5 and 6A illustrate exemplary processes according to embodiments.

FIG. 3 illustrates a process according to an embodiment for performing diagnosis of anomaly events based on case-based reasoning and transfer learning. The illustrated process may be performed by a local diagnosis system or specifically any of the local diagnosis systems 201, 219, 220 of FIG. 2. One or more local databases connected to or comprised in the local diagnosis system may initially assumed to maintain information at least on one or more local cluster models of different clusters and one or more diagnosis labels associated with the one or more local cluster models. Said one or more local databases may comprise one or more databases 202, 203 as defined in relation to FIG. 2 (e.g., at least one local anomaly event database and/or at least one local diagnosis database). As mentioned above, a cluster may be defined to be a data structure comprising a plurality of data points in a performance indicator space defined by a plurality of performance indicators of a communications network. A diagnosis label may be defined as a description attached to a cluster or a cluster model containing at least the predicted common root cause of the anomaly events (i.e., individual data points) defined by the cluster or cluster model.

Each cluster model (local and/or central) may comprise information on the number of anomaly patterns associated with said cluster model and/or on a distribution of one or more anomaly patterns associated with said cluster model in the performance indicator space. Each local cluster model may be one of the following cluster model types: a centroid-based cluster model, a distribution-based cluster model, a density-based cluster model and a hierarchical (or connectivity-based) cluster model. The centroid-based cluster model may be based, e.g., on a k-means algorithm. The density-based cluster model may be based on using a statistical distribution, such as a multivariate normal distribution used by the expectation-maximization algorithm. The density-based cluster model may be based, e.g., on density-based spatial clustering of applications with noise (DB-SCAN) algorithm or ordering points to identify the clustering structure (OPTICS) algorithm. The hierarchical cluster model is based on the idea that data objects being more related to nearby data objects than to data objects farther away (e.g., in performance indicator space). Thus, in hierarchical clustering clusters may be formed by connecting data objects based on their distance. Preferably, all the local cluster models have the same type which also corresponds to any central cluster models used by a central diagnosis system (to be described below in more detail).

Referring to FIG. 3, the local diagnosis system detects, in block 301, one or more anomaly events (or equally one or more anomalies) associated with a communications network or a network instance (later simply a communications network). Each anomaly event defines, by definition, an anomaly pattern which describes a data point in a performance indicator space defined by a plurality of performance indicators of the communications network. The performance indicators may be, here and in the following, key performance indicators (KPIs). Each anomaly pattern may be based on a time-wise aggregation of values of the plurality of performance indicators during an anomaly event. As each anomaly pattern corresponds to a single point in the n-dimensional performance indicator space (with n being a positive integer), anomaly patterns may be equally called anomaly points or simply points or data points. An anomaly pattern may consist, for example, of a vector of the normalized anomaly levels of each performance indicator or raw data values of n performance indicators. Different distance measures may be used to define distance between anomaly patterns. A detected anomaly event may only imply that the communications network is in an unusual, anomalous state, but not necessarily that said state corresponds to degradation. In some embodiments, each detected anomaly pattern may be stored to a local database (e.g., the local anomaly event database) of the one or more local databases.

The detecting in block 301 may consists of simply receiving, in the local diagnosis system, information on the one or more anomaly events associated with the communications network detected by a separate anomaly detector entity, function or system (e.g., element 201 of FIG. 2). Specifically, a database manager of the local diagnosis system (e.g., the database manager 204 of FIG. 2) may receive said information on the one or more anomaly events. In other words, the anomaly detector entity, function or system may evaluate each anomaly event according to its detection criteria and forward information on any anomaly events corresponding to positive detection results (i.e., to a detection) to the local diagnosis system for diagnosing the anomaly event. In other embodiments, the anomaly detector entity, function or system may form a part of the local diagnosis system.

After the detecting in block 301, the local diagnosis system starts the actual diagnosis process. Said diagnosis may be performed in full or at least for the most part by a CBR diagnosis function of the local diagnosis system (e.g., the CBR diagnosis function 205 of FIG. 2). The local diagnosis system updates, in block 302, one or more local cluster models to incorporate the one or more anomaly patterns within complexity constraints of the one or more local cluster models. In other words, the local diagnosis system performs clustering for the one or more anomaly patterns using the one or more local cluster models as a starting point. The one or more local cluster models of different clusters may be maintained in a local diagnosis database.

The complexity constraints may be, specifically, defined for a joint model of the whole clustering comprising the one or more local cluster models (i.e., not separately for each individual local cluster model). Thus, the number of separate cluster models used directly affects the complexity which is limited by the complexity constraints. In addition, the complexity of each individual cluster model may also affect the complexity. The complexity constraints may be evaluated based on a pre-defined metric for clustering model complexity (i.e., joint model complexity of the one or more local cluster models) and a pre-defined threshold for said metric (which may not be exceeded in order stay within the complexity constraints). The pre-defined metric for clustering model complexity may take into account the number of the one or more local cluster models and/or the complexity of each of the one or more local cluster models.

In order to keep the complexity of the one or more local cluster models within the complexity constraints, the local diagnosis system may, for example, exclude, in the updating in block 302, at least one anomaly pattern failing to comply with the one or more local cluster models within the complexity constraints. Said excluded anomaly patterns (later outlier anomaly patterns) may be outlier data points located far (in the sense of the n-dimensional performance indicator space) from any known clusters for which a local cluster model has been established and which, thus, adhere poorly to any simple local cluster models. An anomaly pattern may be defined to be an outlier anomaly patterns, for example, if the probability for the anomaly pattern belonging to a cluster characterized by one of the one or more local cluster models is below a pre-defined threshold for all the one or more local cluster models of clusters. In some embodiments to be discussed in more detail below, the updating of the one or more local cluster models may entail splitting one or more clusters defined through the one or more local cluster models and/or merging at least one set of two or more clusters defined through the one or more local cluster models.

In addition to the pre-defined metric for clustering model complexity, a pre-defined metric may also be defined for the goodness of fit. The pre-defined metric for the goodness of fit may be used to perform the clustering and thus to enable the updating in block 302. The pre-defined metric for the goodness of fit may be calculated for the whole clustering and/or for each individual anomaly pattern. Values of the pre-defined metric for the goodness of fit for individual anomaly patterns may be used to determine the outlier anomaly patterns to be excluded from the one or more local cluster models.

As a result of the updating, each of the one or more anomaly patterns (except the aforementioned outlier anomaly patterns) is associated with a cluster described by one of the one or more updated local cluster models. Further, each local cluster model corresponds to a different diagnosis label (i.e., a root cause). Obviously, the confidence level in the prediction of each anomaly pattern of each cluster may vary.

In response to the local diagnosis system failing according to one or more predefined criteria to incorporate, in the updating, the one or more anomaly patterns to the one or more local cluster models within the complexity constraints in block 303, the local diagnosis system forwards, in block 304, at least the one or more local cluster models and one or more diagnosis labels associated with the one or more local cluster models (i.e., the diagnosis results) to a central diagnosis system for further diagnosis. The incorporating of the one or more anomaly patterns to the one or more local cluster models within the complexity constraints may deemed a failure according to the one or more pre-defined criteria, for example, if one or more outlier anomaly patterns of the one or more anomaly patterns were excluded, in the updating in block 302, from the one or more local cluster models to satisfy the complexity constraints. Alternatively or in addition, the one or more pre-defined criteria may not be satisfied if a pre-defined threshold for a confidence metric indicating confidence in the one or more local cluster models predicting the one or more anomaly patterns is not reached. The forwarded information may comprise information on at least one anomaly pattern of the one or more anomaly patterns. The local diagnosis system may specifically further forward, in block 304, any outlier anomaly patterns to the central diagnosis system for further diagnosis though in other embodiments one or more non-outlier anomaly patterns may also be forwarded. The forwarding in block 304 may be carried out using the knowledge sharing interface (e.g., one of the interfaces 207, 217, 217 of FIG. 2).

In response to the one or more locals cluster models managing to incorporate all of the one or more detected anomaly patterns in block 303 within the complexity constraints, the local diagnosis system may terminate the diagnosis process for the one or more anomaly patterns detected in block 301.

Figure 4:
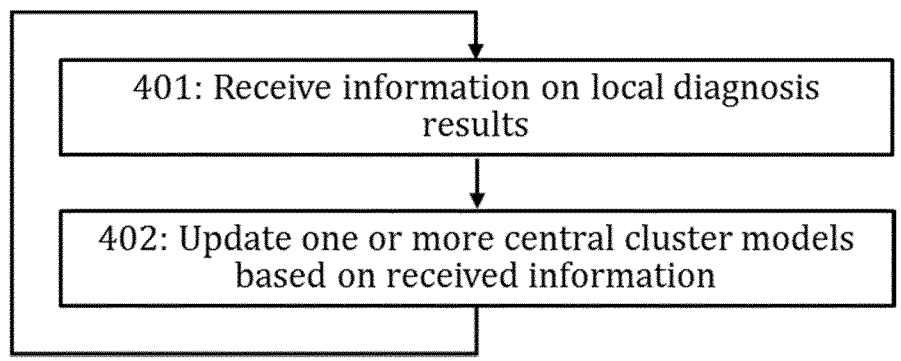

FIG. 4 illustrates another process according to an embodiment for performing diagnosis of anomaly events based on case-based reasoning and transfer learning. The illustrated process may be performed by a central diagnosis system or specifically the central diagnosis system 211 of FIG. 2. One or more central databases connected to or comprised in the central diagnosis system may be initially assumed to maintain information at least on one or more central (statistical) cluster models of different clusters and one or more diagnosis labels associated with the one or more central cluster models. Said one or more central databases may comprise one or more central databases 212, 213 as defined in relation to FIG. 2 (e.g., at least one central anomaly event database and/or at least one central diagnosis database). One or more central cluster models may be maintained in the one or more central databases (or specifically in a central diagnosis database). Said one or more central cluster models may be of any cluster model type mentioned in relation to local cluster models in connection with FIG. 3.

Referring to FIG. 4, the central diagnosis system receives, in block 401, information on one or more local cluster models describing one or more clusters and one or more corresponding diagnosis labels (i.e., information on local diagnosis results) from a local diagnosis system. The one or more local cluster models and the one or more diagnosis labels may relate to anomaly events associated with a communications network (specifically, a communications network or network instance associated with said local diagnosis system). The one or more local cluster models and the one or more diagnosis labels may have been determined according to an embodiment described in relation to FIG. 3. The information on local diagnosis results received in block 401 may further comprise information on one or more outlier anomaly patterns defining one or more data points in the performance indicator space detected by the local diagnosis system but excluded from the one or more local cluster models. The information may be received using the knowledge sharing interface (e.g., one of interfaces 207, 217, 217 of FIG. 2).

After the receiving in block 401, the central diagnosis system starts the diagnosis process which may be performed in full or at least for the most part by a CBR diagnosis function of the central diagnosis system (e.g., the CBR diagnosis function 215 of FIG. 2). The central diagnosis system updates, in block 402, one or more central cluster models (of different clusters) based on the information received from the local diagnosis system to incorporate the one or more local cluster models to the one or more central cluster models within complexity constraints of the one or more central cluster models. As described for the local diagnosis system, metrics for clustering model complexity and goodness of fit may be defined and used in the updating. Further, the complexity constraints may also be defined in a similar manner as described for the local diagnosis system in relation to FIG. 3 though the complexity constraints may be stricter (or less strict in some cases) compared to the local diagnosis system.

The central diagnosis system may, in addition to attempting to incorporate the one or more local cluster models) attempt to incorporate into the one or more central diagnosis models any outlier anomaly patterns received in block 401. Similar to the one or more local cluster models, the complexity constraints may be defined to limit the (joint) complexity of the one or more central cluster models. Therefore, the central diagnosis system may also exclude from the updating in block 402 one or more outlier anomaly patterns which adhere poorly to any central cluster models within the complexity constraints, similar to as described for the local diagnosis system. The central diagnosis system may be relatively reluctant to update its cluster models to fit the information received from the local diagnosis system so as to achieve less precise, but more general cluster models. In contrast, the local diagnosis system may incorporate information received from the central diagnosis system more fluently. This difference may be realized simply by using different parametrization (achieved, e.g., by using stricter complexity constraints) of the same clustering algorithm.

The updating of the cluster model(s) in block 402 (and/or in block 302 of FIG. 3) may additionally be governed by the number of observations (i.e., the number of anomaly events) to which the diagnosis system has access. As the central diagnosis system may receive information from multiple local diagnosis systems, its cluster models may incorporate over time a large number of observations (i.e., large number of anomaly events) which makes said central cluster models naturally slower to change compared to the local cluster models.

In the embodiment illustrated in FIG. 4, the process may be terminated after the updating in block 402, at least until new local diagnosis results are received. However, in other embodiments to be discussed in relation to FIG. 6 in more detail, the central diagnosis system may forward its diagnosis results (i.e., one or more central diagnosis models, one or more corresponding diagnosis labels and possibly one or more outlier anomaly pattern excluded from the one or more central diagnosis models) to the local diagnosis system (from which information was received in block 401) for further diagnosis. Said forwarding may be triggered, for example, if at least one outlier anomaly pattern is excluded, in block 402, from the one or more central cluster models to satisfy the complexity constraints and/or if the received information in block 401 comprised one or more outlier anomaly patterns excluded from the one or more local cluster models (indicating that the one or more local cluster models require further refinement).

As described in relation to FIGS. 3 and 4, clustering plays a significant part in the embodiments. The clustering serves two purposes. Firstly, it is a fine enough quantization/resolution of the performance indicator space, with which root causes associated with different anomaly events can be described by attaching to each cluster (that is, each local/central cluster model) a single diagnosis label or root cause. Secondly, the clusters also serve to describe the anomaly event distribution in the performance indicator space, from which the original statistical distribution can be reconstructed/resampled with enough precision.

Figure 5:
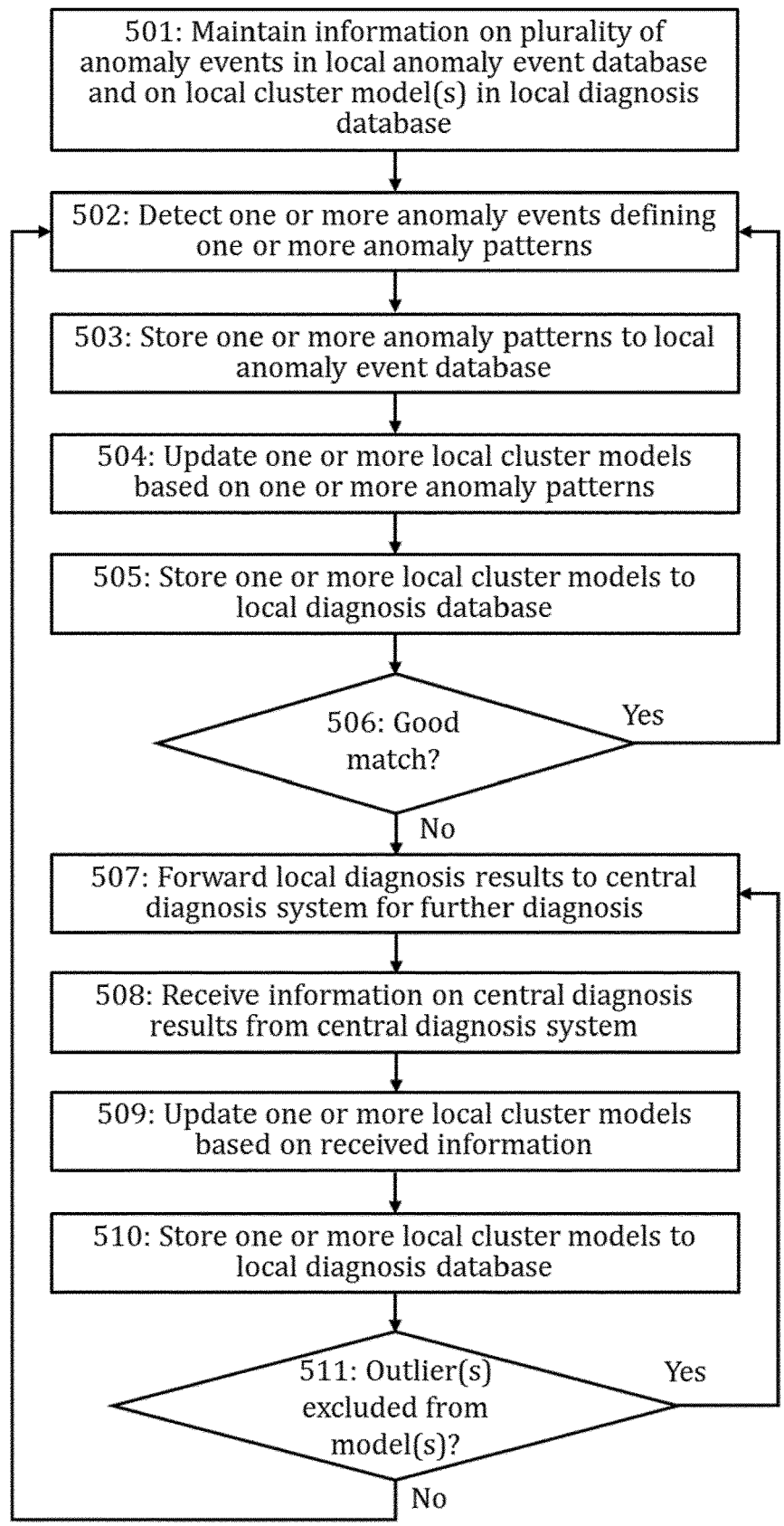

FIG. 5 illustrates another process according to an embodiment for performing diagnosis of anomaly events based on case-based reasoning and transfer learning by a local diagnosis system. Specifically, the illustrated process may be performed by any of the local diagnosis systems 201, 219, 220 of FIG. 2.

Initially, information on a plurality of anomaly events defining a plurality of anomaly patterns is maintained, in block 501, in a local anomaly event database. Moreover, information on one or more local cluster models of different clusters and one or more diagnosis labels associated with the one or more local cluster models are maintained, also in block 501, in a local diagnosis database. At least the most up-to-date or recent cluster model for each know cluster is maintained in the local diagnosis database. The local diagnosis database may further maintain information on any outlier anomaly patterns excluded from the one or more local cluster models. In some embodiments, the local diagnosis database may further maintain information on one or more central cluster models and corresponding one or more diagnosis labels and optionally any associated outlier anomaly patterns.

As described in relation to block 301 of FIG. 3, the local diagnosis system detects, in block 502, one or more anomaly events associated with a communications network, each anomaly event defining an anomaly pattern. Then, the local diagnosis system stores, in block 503, the one or more anomaly patterns to the local anomaly event database.

Actions pertaining to blocks 504, 506, 507 may correspond to actions described in relation to blocks 302 to 304 of FIG. 3 and thus will not be repeated here for brevity. In block 505, the local diagnosis system stores the one or more updated local cluster models and optionally any outlier anomaly patterns excluded from the one or more updated local cluster models to the local diagnosis database.

After the local diagnosis results (i.e., one or more local cluster models, corresponding one or more diagnosis labels and possibly one or more outlier anomaly patterns if any exist) have been forwarded in block 507 (using the knowledge sharing interface), the local diagnosis system receives, in block 508, from the central diagnosis system (using the knowledge sharing interface), information on central diagnosis results (i.e., one or more central cluster models, corresponding one or more diagnosis labels and possibly one or more outlier anomaly patterns excluded from the one or more central cluster models). Criteria for the central diagnosis system forwarding its diagnosis results is discussed in relation to FIG. 6.

The local diagnosis system updates, in block 509, the one or more local cluster models and the one or more diagnosis labels corresponding to the one or more central cluster models based on the received information (i.e., the one or more central cluster models, corresponding one or more diagnosis labels and possibly one or more outlier anomaly patterns excluded from the one or more central cluster models). If the central diagnosis results received in block 508 comprised one or more outlier anomaly patterns excluded from the one or more central cluster models, the local diagnosis system attempts to also incorporate said one or more outlier anomaly patterns to the one or more local cluster models within the complexity constraints of the one or more local cluster models. In other words, the local diagnosis system attempts to learn from the diagnosis results of the central diagnosis system in order to improve its own corresponding cluster model(s). For example, if two closely spaced clusters are represented by two separate central cluster models but by only one local cluster model, the local diagnosis system may try to split the corresponding local cluster model into two local cluster models to improve the confidence in the local diagnosis.

If the one or more local cluster models fail to incorporate, even after the updating in block 509, all of the one or more anomaly patterns detected in block 502 to the one or more local cluster models within the complexity constraints in block 509, the local diagnosis system forwards, in block 507, the most recent local diagnosis results to the central diagnosis system for further diagnosis. The forwarded most recent local diagnosis results may comprise at least the one or more local cluster models, the one or more diagnosis labels associated with the one or more local cluster models and one or more outlier anomaly patterns excluded from the one or more local cluster models. The local diagnosis system again stores, in block 510, the one or more updated local cluster models and optionally any outlier anomaly patterns excluded from the one or more updated local cluster models to the local diagnosis database. The process described with block 507 to 510 is repeated until the local diagnosis system is able to update the one or more local cluster models (in block 509) in such a way that no outlier anomaly patterns need to be excluded in block 511 from the one or more local cluster models while still satisfying the complexity constraints. If no outlier anomaly patterns are excluded from the one or more local cluster models in block 511, the process may be terminated for that particular set of anomaly events and repeated once one or more new anomaly events are detected in block 502.

Figure 6A:
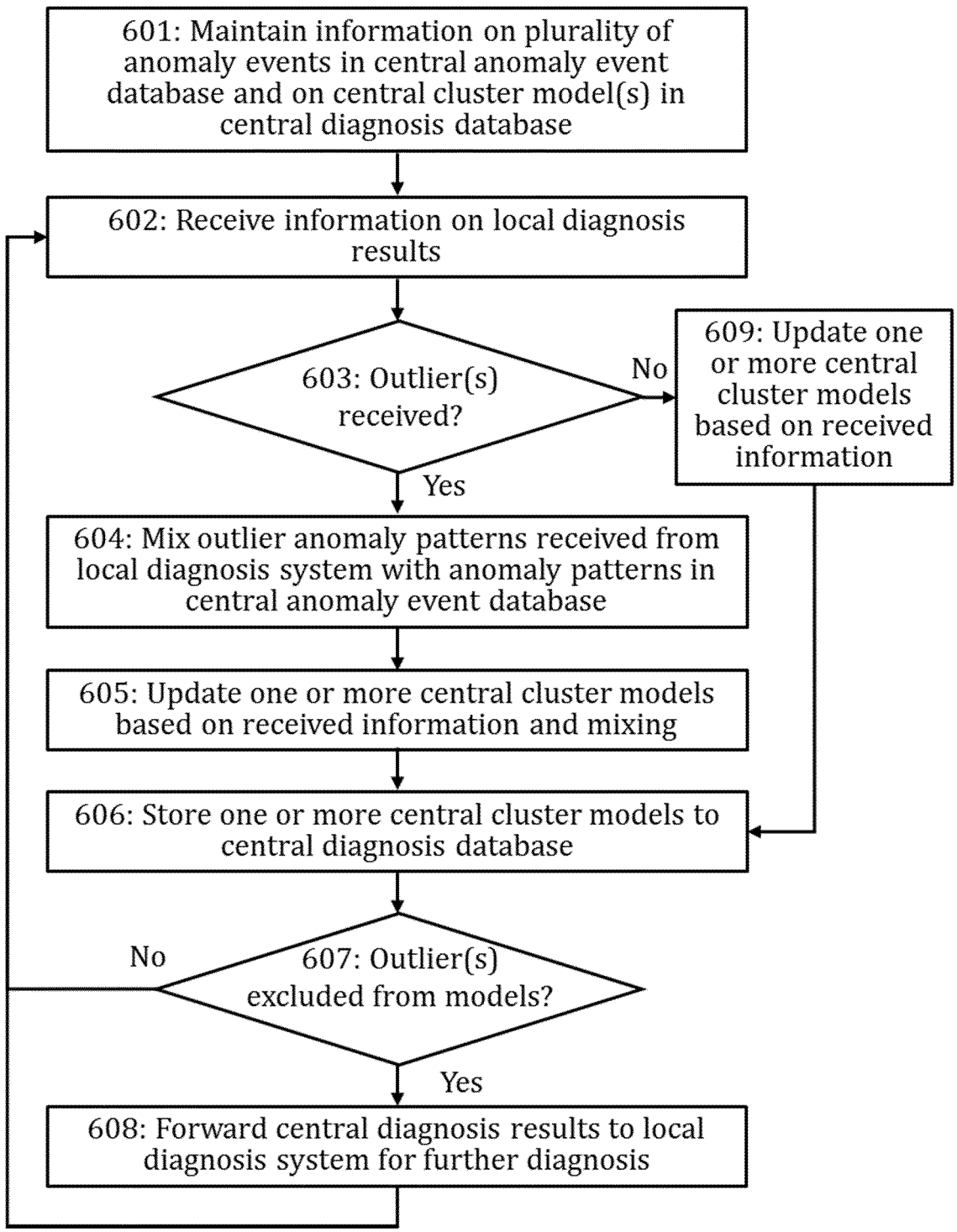

FIG. 6A illustrates a process according to an embodiment carried out by a central diagnosis system in response to the local diagnosis system carrying out the process of FIG. 5. Specifically, the illustrated process may be performed by the central diagnosis system 211 of FIG. 2. Any transmission of information between the central diagnosis system and the local diagnosis system in the embodiment may be carried out using the knowledge sharing interface (e.g., one of the interfaces 207, 217, 217 of FIG. 2).

Initially, information on a plurality of anomaly events defining a plurality of anomaly patterns is maintained, in block 601, in a central anomaly event database. As described in relation to FIG. 2, the central diagnosis database may not store every single anomaly pattern that was once submitted to it, but only maintain a representative sample of anomaly patterns having a pre-defined size. Moreover, information on one or more central cluster models of different clusters and one or more diagnosis labels associated with the one or more central cluster models are maintained, also in block 501, in a central diagnosis database. At least the most up-to-date or recent cluster model for each known cluster is maintained in the central diagnosis database. The central diagnosis database may further maintain information on any outlier anomaly patterns excluded from the one or more central cluster models. In some embodiments, the central diagnosis database may further maintain information on one or more local cluster models associated with one or more local diagnosis systems and corresponding one or more diagnosis labels and optionally any associated outlier anomaly patterns.

The central diagnosis system receives, in block 602, from a local diagnosis system, information on local diagnosis results. The local diagnosis results may comprise at least on one or more local cluster models describing one or more clusters and one or more diagnosis labels corresponding to the one or more local cluster models. The information on local diagnosis results may further comprise information on one or more outlier anomaly patterns defining one or more data points in the performance indicator space excluded from the one or more local cluster models and/or information on one or more individual (non-outlier) anomaly patterns included in the one or more local cluster models. At least one of the one or more anomaly patterns (i.e., one or more outlier and/or non-outlier anomaly patterns) received from the local diagnosis system may be stored to the central anomaly event database upon reception. In other words, the received anomaly patterns may be mixed in with the existing sample observations of the central anomaly event database.

It is determined in block 603 whether any outlier anomaly patterns were received as a part of the local diagnosis results in block 602. If one or more outlier anomaly patterns were received in block 603, the central diagnosis system mixes, in block 604, the one or more outlier anomaly patterns with one or more anomaly patterns sampled from the plurality of anomaly patterns maintained in the central anomaly event database to produce a sample set of anomaly patterns. In other words, individual data points (i.e., individual anomaly patterns) are sampled from the central anomaly event database to recreate the distribution of data points contained in the clusters modelled by the one or more local cluster models. The one or more outlier anomaly patterns (and optionally any non-outlier anomaly patterns communicated to the central diagnosis system) are mixed with the synthesized data points. The (re)sampling procedure allows the central diagnosis system to maintain a central diagnosis database of a constant size, rather than continuously collecting information.

After the mixing, the central diagnosis system updates, in block 605, one or more central cluster models based on the one or more local cluster models, the one or more corresponding diagnosis labels and the sample set of anomaly patterns to incorporate the one or more local cluster models and the one or more outlier anomaly patterns to the one or more central cluster models within the complexity constraints of the one or more central cluster models. The central diagnosis system may store, in block 606, the one or more central cluster models after the updating to the central diagnosis database.

In block 607, another outlier check is performed. Specifically, it is determined in block 607 whether at least one outlier anomaly pattern was excluded in the updating from the one or more central cluster models to satisfy the complexity constraints. If this is true (i.e., at least one outlier anomaly pattern was excluded), the central diagnosis system forwards, in block 608, the one or more central cluster models, one or more diagnosis labels associated with the one or more central cluster models and said at least one outlier anomaly pattern to the local diagnosis system for further diagnosis. It may further be determined in block 607 whether any outlier anomaly patterns were received as a part of the local diagnosis results in block 602 (i.e., the check in block 603 is repeated). In such embodiments, the forwarding in block 608 may be carried always if at least one outlier anomaly pattern was received from the local diagnosis system, regardless of the diagnosis results of the central diagnosis system. Obviously, in this case only the one or more central cluster models and the associated one or more diagnosis labels may be forwarded in block 608 if no outlier anomaly patterns needed to be excluded from the one or more central cluster models.

If no outlier anomaly patterns were received in block 603, the central diagnosis system may perform the updating of the one or more central cluster models in block 609 similar to as described in relation to block 302 of FIG. 3. The storing in block 607 and forwarding in block 608 may be carried out, thereafter, as described above. As no outlier anomaly patterns were received in block 602 and no outlier anomaly patterns may be generated in the updating in block 609, the check in block 607 may, in such cases, always have a negative outcome.

FIGS. 6B, 6C, 6D and 6E illustrate an exemplary operation of the process of FIG. 6A (or a part of said process). Specifically, said Figures illustrate a two-dimensional (key) performance indicator space at different stages of the process illustrated in FIG. 6A.

Figure 6B:
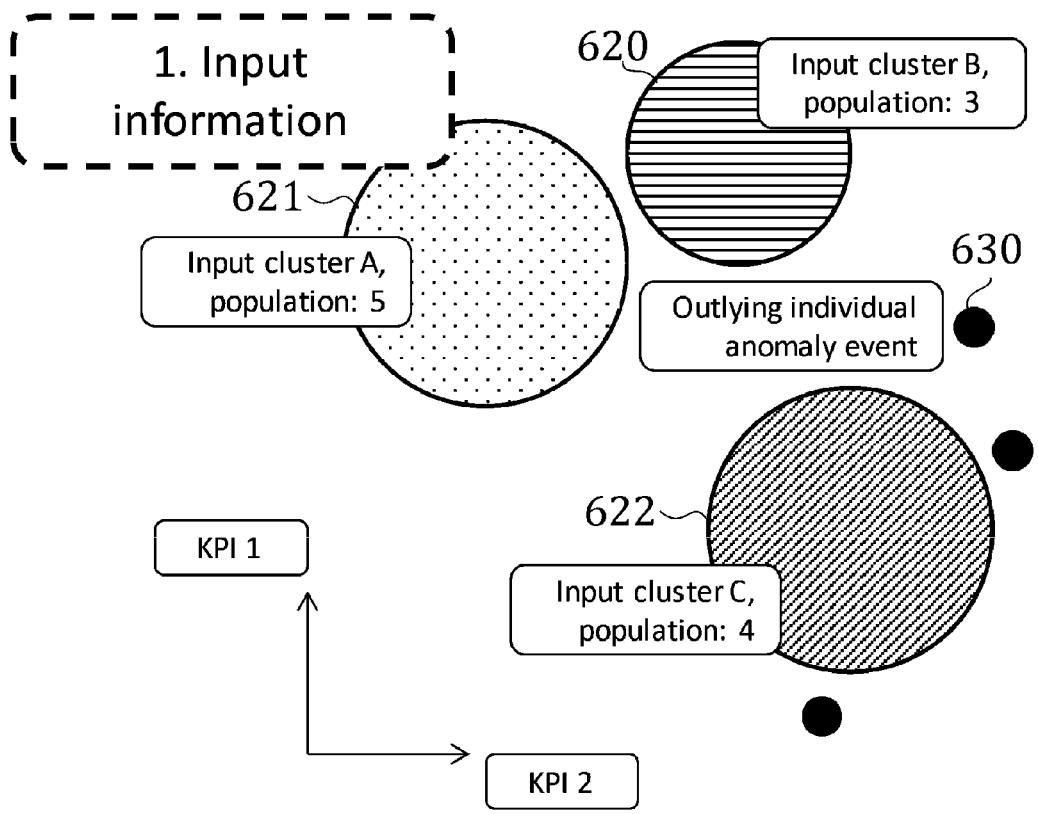
FIGS. 6B, 6C, 6D, 6E, 7A, 7B, 8A and 8B illustrate exemplary functionalities according to embodiments.

In FIG. 6B, three local cluster models 620, 621, 622 and three outlier anomaly patterns 630 excluded from the three local cluster models 620, 621, 622 are received as an input. FIG. 6B corresponds to block 602 of FIG. 6A.

Figure 6C:
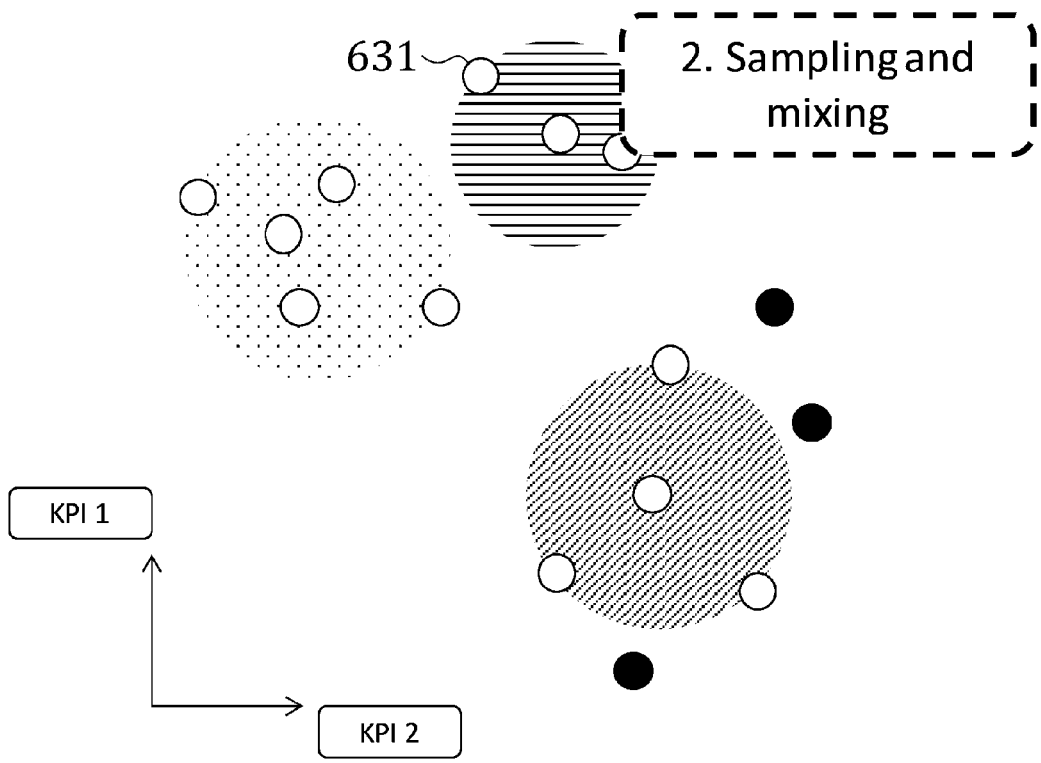

In FIG. 6C, twelve data points 631 in the performance indicator space (i.e., twelve anomaly patterns) are sampled from the central anomaly event database. Specifically, three data points are sampled based on a first local cluster model 620, five data points are sampled based on a second local cluster model 621 and four data points are sampled based on a third local cluster model 622. FIG. 6C corresponds to block 604 of FIG. 6A.

Figure 6D:
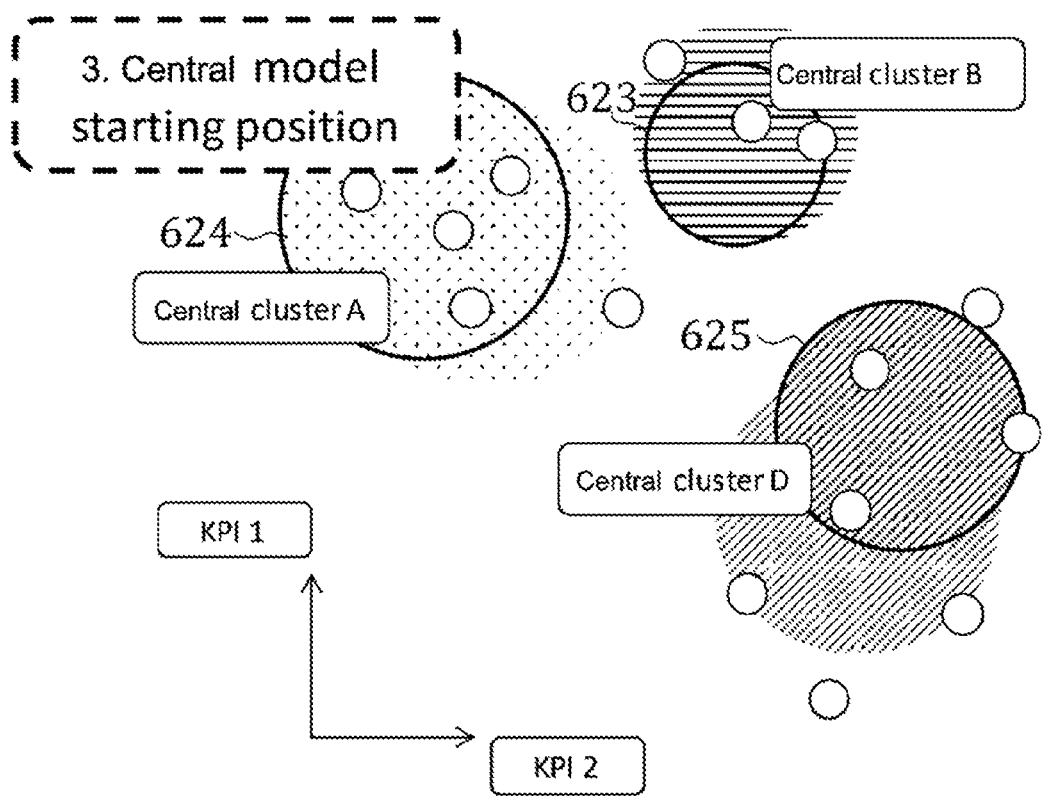

In FIG. 6D, the three central cluster models 623, 624, 625 (shown with black outlines) corresponding closest to the three local cluster models 620, 621, 622 are shown along with the three local cluster models 620, 621, 622 (shown without outlines), the three outlier anomaly patterns 630 and the twelve sampled data points 631.

Figure 6E:
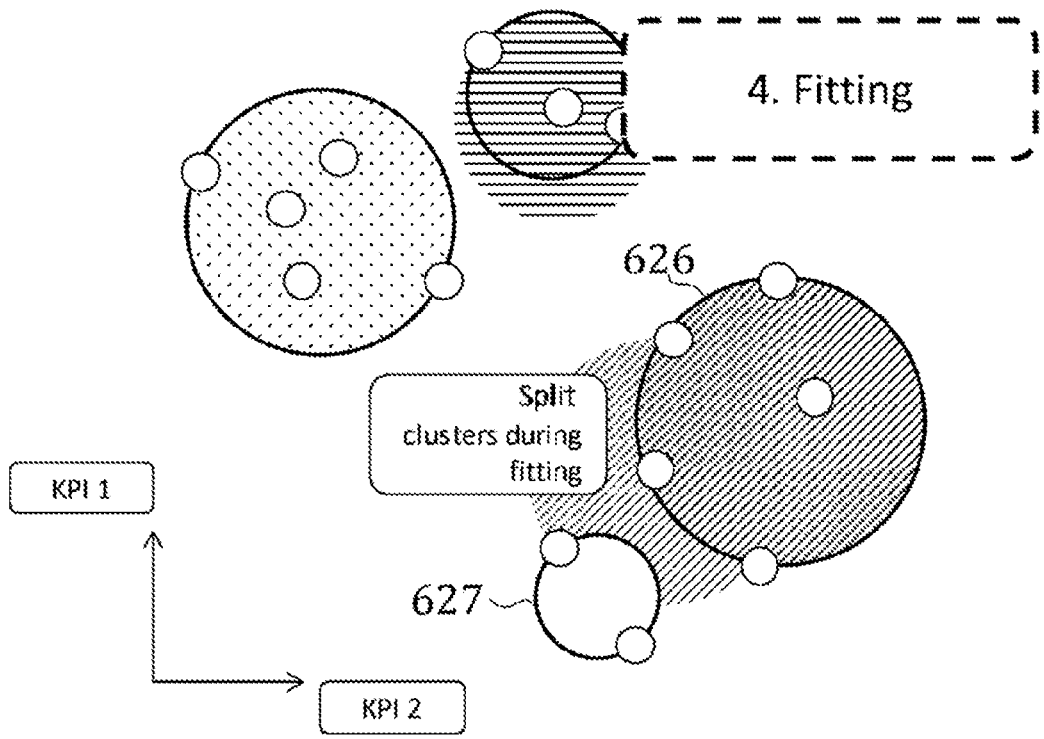

In FIG. 6E, the result of the updating of the three central cluster models in an effort to incorporate the three local cluster models and the three outlier anomaly patterns is shown. In this particular example, the best fit was achieved when the central cluster model 625 was split into two different central cluster models 626, 627. FIG. 6E corresponds to block 605 of FIG. 6A.

To be able to work in the described context, and use the knowledge sharing interface, the clustering (e.g., as performed in any of block 302 of FIG. 3, block 402 of FIG. 4, block 502 and 506 of FIG. 5 and block 605 of FIG. 6A) may be performed according to a clustering algorithm following one or more of the following criteria.

Firstly, the clustering may be performed using a combination of one or more input cluster and one or more individual anomaly events (e.g., one or more outlier anomaly patterns) as an input. This functionality may be achieved by using a sampling method that recreates a distribution from a given clustering (i.e., from multiple clusters that cover a set of anomaly patterns), with the additional individual observations mixed in, as described in FIGS. 6A, 6B, 6C, 6D and 6E.

Secondly, the clustering may be continuable, by adding anomaly patterns and/or whole clusters to the clustering and running the clustering algorithm from a specified starting position (which is the result of the previous clustering run). This criterion as well as all the following criteria may be fulfilled by using a quantization algorithm, such as k-means or Bounding Sphere Quantization (BSQ). In the following, a simple implementation using the BSQ algorithm is discussed as an example. The BSQ algorithm iteratively fits K number of clusters on a set of points, while trying to minimize the maximum distance from the cluster centroids to the points in the cluster for the whole clustering. Here, K is a positive integer and a cluster centroid is defined as a single representative/descriptive point of a cluster, usually the mean or geometric center of the cluster. The aforementioned tendency of the BSQ algorithm produces roughly equal-sized clusters in the end, if the clusters are represented as n-dimensional spheres, with their center being the centroid, and the radius the distance to the farthest point in the cluster. Regarding the second criterion, as the BSQ algorithm uses the iterative Expectation-Maximization algorithmic structure for the model fitting procedure, the fitting stops when the algorithm converges, and the output no longer changes. This process may be restarted naturally by moving the model out of this converged state, for example, by introducing new observations (i.e., new anomaly patterns), or changing the underlying distribution of points. This is exactly what is needed for the clustering algorithm to be able to continue from a previous state.

Thirdly, the clustering may be constrained in the complexity of the fitted models. The BSQ algorithm fits a predefined number of clusters. This number governs the complexity of the fitted model, so that less clusters produce a simple model, while more clusters produce a complex one. This number is defined outside of the algorithm.

Fourthly, the clustering may be able to output a goodness of fit value for each clustered point (a value of the predefined metric for the goodness of fit for individual anomaly patterns as discussed in relation to FIG. 3), so that some points can be recognized as ill-fitting to the clustering. A maximum radius may be defined for the quanta during fitting for the BSQ algorithm. This way, any data point that is not inside any of the spheres at the end of the model fitting may be considered an outlier. In this case, the goodness of fit value is a binary good fit/bad fit value for single data points, which may be summarized for the whole clustering as a numeric value by counting the number of outlier points.

Fifthly, the clustering algorithm may be able to split and merge clusters received as input, within the complexity constraints. As clusters within the BSQ algorithm are solely defined by their centroids, splitting and merging of clusters only involves splitting and merging of single data points. This task is trivial. Deciding which clusters to split and merge, however, is more complicated, and will be discussed in detail in relation to FIGS. 7A, 7B, 8A and 8B.

Sixthly, the clustering may be able to retain information about the number of assigned observations to each cluster, and a definition of the distribution of points within, so that a similar distribution may be recreated using the clustering information. The number of assigned data points may be saved by counting the number of points inside the sphere of each cluster. If the clustering is fine enough, i.e., K is sufficiently large, generating a given amount of data points with a uniform distribution inside a cluster reproduces the original overall distribution with high accuracy. Alternatively, the same amount of data points may be sampled from a sample database.

In the case of the BSQ algorithm, the goodness of fit may be derived from the quantization simply by looking for points that did not make it into any cluster. If there are any, the model needs to be refined, and the iterative knowledge exchange may be initiated.

As mentioned above, cluster models may be added or removed from the set of one or more local/central cluster models to be updated so as to automatically fit the clustering model complexity to the complexity of the underlying data structure. In the case of quantization algorithms that define clusters with only a single point, the mechanical act of splitting and merging is uncomplicated. Automatic decisions may be implemented to decide when to split or merge clusters.

According to an embodiment, the splitting and/or merging may be performed by a local/central diagnosis system as follows. The local/central diagnosis system may, first, perform initial updating of one or more local/central cluster models without modifying the number of the one or more local/central cluster models. Then, the local/central diagnosis system may calculate a value for a confidence metric indicating confidence in the one or more local/central cluster models predicting the one or more central/local cluster models, respectively, and possibly one or more associated outlier anomaly patterns. The confidence metric may be defined to increase with an increase in goodness of fit (evaluated, e.g., using the pre-defined metric for goodness of fit discussed in relation to FIG. 3) and with a decrease in clustering model complexity (i.e., complexity in the combined or joint model of the one or more local/central cluster models or in the clustering model). In response to determining that splitting at least one local/central cluster model causes an increase in the confidence metric, the local/central diagnosis system may split each of said at least one central cluster model to two (or more) central cluster models. Similarly, in response to determining that merging at least one set of at least two local/central cluster models causes an increase in the confidence metric, the local/central diagnosis system merges each of said at least one set of at least two local/central cluster models to a single local/central cluster model. Adding and removing local/central cluster models may also be carried out in a similar manner. In other words, in response to determining that removing at least one local/central cluster model causes an increase in the confidence metric, the local/central diagnosis system may remove said at least one local/central cluster model. Moreover, in response to determining that adding at least one local/central cluster model causes an increase in the confidence metric, the local/central diagnosis system may add said least one local/central cluster model.

Figure 7A:
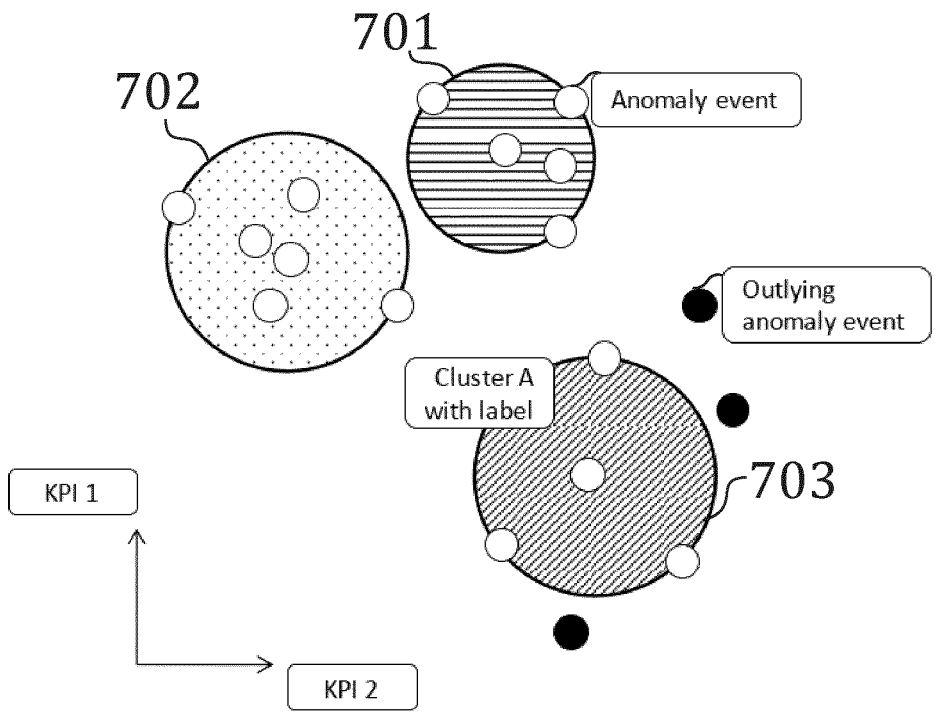
Figure 7B:
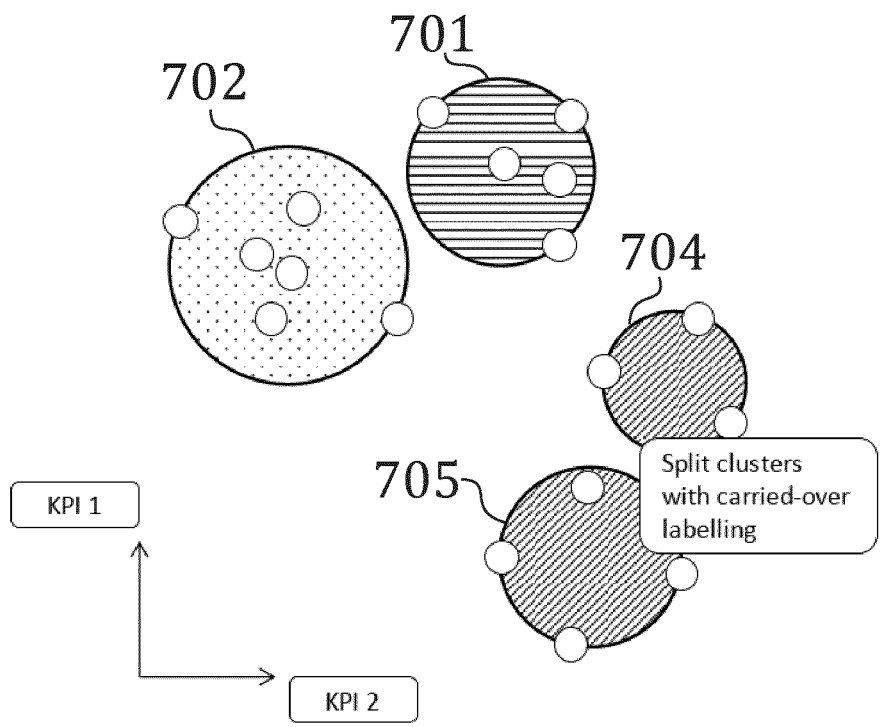

In general, splitting may be carried out in cases where many data points are lying outside a cluster defined by a cluster model so that an additional cluster model could cover the outlying points so well that it counteracts the decrease in confidence (i.e., a confidence metric) stemming from the increased clustering model complexity. Split cluster models may carry over labelling information (i.e., the diagnosis label) within certain limits regarding distance from the original cluster model, overlap of the clusters defined by the cluster models or surrounding cluster models with the same/different labels. If no labelling information may be assigned to the newly formed cluster models with high confidence, cluster models are left (temporarily) as unlabeled. FIGS. 7A and 7B illustrate an exemplary splitting scenario in two-dimensional (key) performance indicator space where a cluster model 703 of altogether three cluster models 701, 702, 703 in FIG. 7A is split into two separate cluster models 704, 705 in FIG. 7B.

Figure 8A:
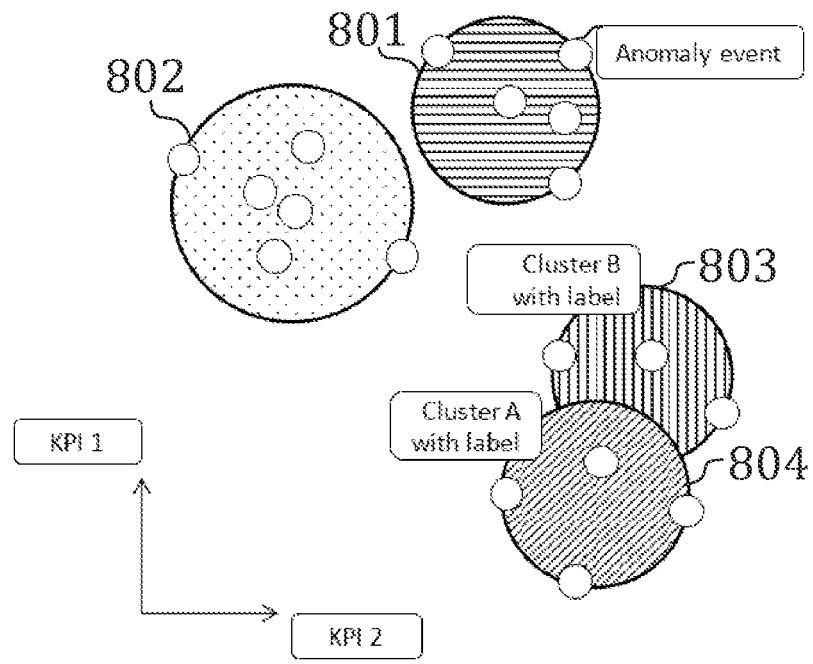
Figure 8B:
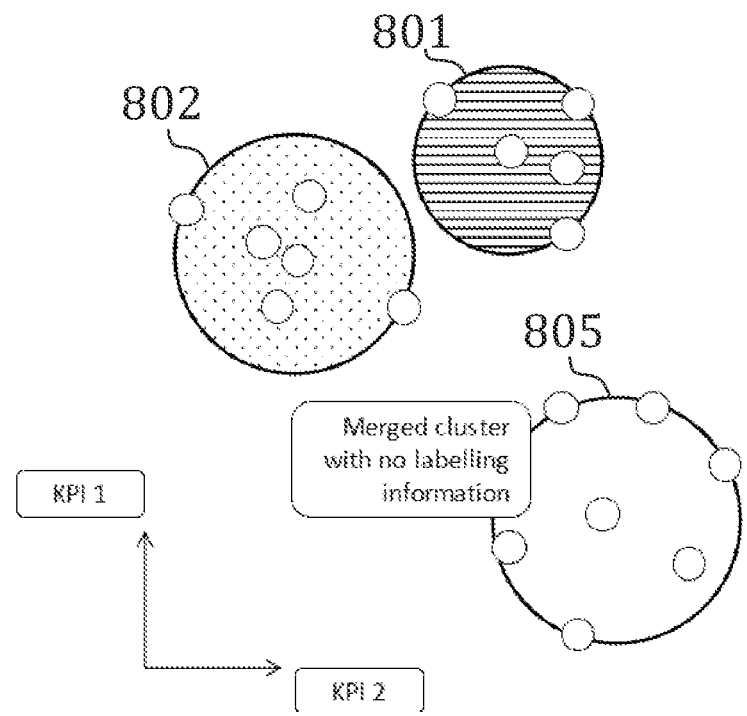

The merging of clusters (or cluster models) follows the same basic concepts as splitting. Two clusters should be merged if the decrease in clustering model complexity overtakes the potential increase in goodness of fit. Labelling information may be carried over from the original clusters if it fulfils criteria regarding similarity of parent labels, surrounding labels, and overlap. Otherwise, the newly formed cluster is unlabeled and the knowledge sharing process is started. FIGS. 8A and 8B illustrate an exemplary merging scenario in two-dimensional performance indicator where two cluster models 803, 804 of altogether four cluster models 801, 802, 803, 804 in FIG. 8A are merged into a single cluster models 805 in FIG. 8B.

The self-healing solutions based on transfer learning and case-based reasoning according to embodiments provide multiple benefits over conventional self-healing solutions. The embodiments enable bootstrapping of a diagnosis database in new deployments, updating the diagnosis database in the case of discontinuous events that invalidate the existing database, e.g., after a significant software upgrade, diagnosis knowledge can be shared from a deployment where the same upgrade was already performed earlier. Further, the embodiments enable early detection and diagnosis of problems not previously encountered in a given network by sharing diagnosis knowledge from other deployments, where the issue has been encountered before (in a way "predictive" self-healing). The knowledge sharing is perfectly suited for the iterative nature of CBR-based diagnosis functions, especially for self-organizing network self-healing use cases. The iterative and incremental nature of the method means that regular sharing of local cluster models ensures that the central cluster models in the central diagnosis system better represent the needs of a given local diagnosis system and that the local diagnosis system is able to get the most advantage from the knowledge received from the central diagnosis system. This creates a symbiotic incentive for sharing labelled data to the central diagnosis system.

As most of the anomaly event distribution information is communicated through the fitted cluster models, the signaling load on the knowledge sharing interface is significantly lower compared to conventional system where all individual anomaly events (or patterns) are transferred. Similarly, knowledge sharing through the clustering information offers a high level of privacy security through obfuscation. Information of each individual local diagnosis system is not communicated, stored or shared to other local diagnosis system as a whole, making the proposed system well-suited for multi-operator information sharing scenarios.

In an embodiment, there is provided a self-learning diagnosis system (e.g., the system 200 of FIG. 2) comprising at least one or more local diagnosis systems according to any embodiment and a central diagnosis system according to any embodiment. The central diagnosis system may be connected to each of said one or more local diagnosis systems through one or more interfaces (e.g., one or more knowledge sharing interfaces as discussed above).

The blocks, related functions, and information exchanges described above by means of FIGS. 2, 3, 4, 5, 6A, 6B, 6C, 6D, 6E, 7A, 7B, 8A and 8B in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 9:
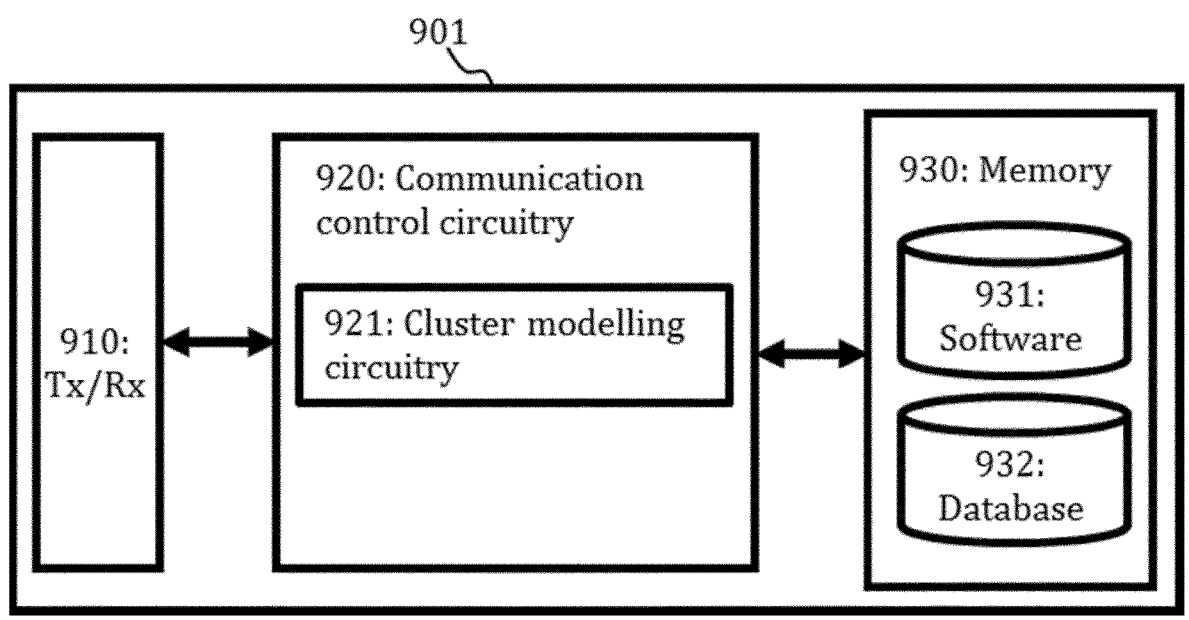
FIG. 9 illustrates an apparatus according to embodiments.

FIG. 9 provides a local diagnosis system 901 according to some embodiments or a central diagnosis system 901 according to some embodiments. Specifically, FIG. 9 may illustrate a local diagnosis system configured to carry out at least the functions described above in connection with detecting anomaly events, updating cluster model(s) to incorporate anomaly patterns and/or central cluster models, forwarding the results of the updating to a central diagnosis system and receiving diagnosis results from central diagnosis system. The local diagnosis system 901 may be any of the local diagnosis systems 201, 219, 220 of FIG. 2. FIG. 9 may alternatively illustrate a central diagnosis system configured to carry out at least the functions described above in connection with receiving diagnosis results from a local diagnosis system, updating central cluster model(s) to incorporate the local diagnosis results and forwarding the results of the updating to the local diagnosis system. The central diagnosis system 901 may be the central diagnosis system 211 of FIG. 2. Each local diagnosis system or central diagnosis system may comprise one or more communication control circuitry 920, such as at least one processor, and at least one memory 930, including one or more algorithms 931, such as a computer program code (software) wherein the at least one memory and the computer program code (software) are configured, with the at least one processor, to cause the local diagnosis system or the central diagnosis system to carry out any one of the exemplified functionalities of the local diagnosis system or a central diagnosis system described above, respectively. Said at least one memory 930 may also comprise at least one database 932. Said at least one database may correspond to databases 202, 203 or 212, 213 and comprise an anomaly event database and/or a diagnosis database, as described in relation to above embodiments. Alternatively, the database may be some other database and the local or central diagnosis system may be connected via the interfaces 910 to at least one external databases corresponding to the databases 202, 203 or 212, 213 described in relation to above embodiments.

Referring to FIG. 9, the communication control circuitry 920 of the local diagnosis system or the central diagnosis system 901 comprise at least cluster modelling circuitry 921 which is configured to perform generate and/or update cluster models. To this end, the cluster modelling circuitry 921 of the local diagnosis system 901 is configured to carry out functionalities described above by means of any of FIGS. 3, 5, 7A, 7B, 8A and 8B using one or more individual circuitries. The cluster modelling circuitry 921 of the central diagnosis system 901 is configured to carry out functionalities described above by means of any of FIGS. 4, 6A, 6B, 6C, 6D, 6E, 7A, 7B, 8A and 8B Referring to FIG. 9, the memory 930 may be implemented using any suitable data storage technology, such as semiconductor based memory devices, flash memory, magnetic memory devices and systems, optical memory devices and systems, fixed memory and removable memory.

Referring to FIG. 9, the local or central diagnosis system 901 may further comprise different interfaces 910 such as one or more communication interfaces (TX/RX) comprising hardware and/or software for realizing communication connectivity according to one or more communication protocols. Specifically, the one or more communication interfaces 910 may comprise the knowledge sharing interface (i.e., any of elements 207, 217, 218 of FIG. 2). The one or more communication interfaces may further comprise one or more human-machine interfaces as described in relation to above embodiments. The one or more communication interface 910 may provide the local or central diagnosis system with communication capabilities to communicate in a cellular communication system and enable communication between user devices (terminal devices) and different network nodes or elements and/or a communication interface to enable communication between different network nodes or elements, for example. The one or more communication interfaces 910 may comprise standard well-known components such as an amplifier, filter, frequency-converter, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 2, 3, 4, 5, 6A, 6B, 6C, 6D, 6E, 7A, 7B, 8A and 8B may be carried out by an apparatus comprising corresponding means for carrying out at least some of the described processes. Some example means for carrying out the processes may include at least one of the following: detector, processor (including dualcore and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2, 3, 4, 5, 6A, 6B, 6C, 6D, 6E, 7A, 7B, 8A and 8B or operations thereof.

Embodiments as described may also be carried out in the form of a computer process defined by a computer program or portions thereof. Embodiments of the methods described in connection with FIGS. 2, 3, 4, 5, 6A, 6B, 6C, 6D, 6E, 7A, 7B, 8A and 8B may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A local diagnosis system comprising: at least one processor; and at least one memory including computer program code, the at least one memory and the computer program code configured, with the at least one processor, to cause the local diagnosis system at least to perform:

detecting one or more anomaly events associated with a communications network, wherein each anomaly event defines an anomaly pattern, each anomaly pattern describing a data point in a performance indicator space defined by a plurality of performance indicators of the communications network and being based on a timewise aggregation of values of the plurality of performance indicators during an anomaly event, updating one or more local cluster models to incorporate the one or more anomaly patterns within complexity constraints of the one or more local cluster models, wherein each of the one or more local cluster models corresponds to a different cluster and to a different diagnosis label defining a diagnosis, a cluster being a data structure comprising a plurality of data points in the performance indicator space, wherein the complexity constraints of the one or more local cluster models are evaluated based on a number of the one or more local cluster models and/or the complexity of each of the one or more local cluster models while attempting to incorporate the one or more outlier anomaly patterns excluded from the one or more central cluster models to the one or more local cluster models, and in response to failing according to one or more predefined criteria to incorporate, in the updating, the one or more anomaly patterns to the one or more local cluster models within the complexity constraints based on received information, all of the one or more anomaly patterns to the one or more local cluster models within the complexity constraints, forwarding at least the one or more local cluster models and one or more diagnosis labels associated with the one or more local cluster models to a central diagnosis system for further diagnosis.

2. The local diagnosis system according to claim 1, wherein the at least one memory and the computer program code are configured, with the at least one processor, to cause the local diagnosis system to perform:

maintaining, in a local diagnosis database, at least the one or more local cluster models of different clusters and the one or more diagnosis labels associated with the one or more local cluster models; and storing the one or more local cluster models after the updating to the local diagnosis database.

3. The local diagnosis system according to claim 2, wherein the at least one memory and the computer program code are configured, with the at least one processor, to cause the local diagnosis system to perform:

maintaining, in a local anomaly event database, information on a plurality of anomaly events defining a plurality of anomaly patterns; and storing, after the detecting, the one or more anomaly patterns to the local anomaly event database.

4. The local diagnosis system according to claim 1, wherein the at least one memory and the computer program code are configured, with the at least one processor, to cause the local diagnosis system to perform:

excluding, in the updating, from the one or more local cluster models at least one outlier anomaly pattern of the one or more anomaly patterns failing to comply with the one or more local cluster models within the complexity constraints.

5. The local diagnosis system according to claim 4, wherein the at least one memory and the computer program code are configured, with the at least one processor, to cause the local diagnosis system, in response to failing to incorporate, in the updating, the one or more anomaly patterns to the one or more local cluster models within the complexity constraints by excluding the at least one outlier anomaly pattern, to perform:

forwarding also information on one or more outlier anomaly patterns excluded in the updating to the central diagnosis system for further diagnosis.

6. The local diagnosis system according to claim 1, wherein the at least one memory and the computer program code are configured, with the at least one processor, to cause the local diagnosis system to perform after the forwarding:

in response to receiving, from the central diagnosis system, one or more central cluster models and one or more diagnosis labels corresponding to the one or more central cluster models, updating the one or more local cluster models based on the one or more central cluster models and the one or more diagnosis labels corresponding to the one or more central cluster models; and in response to the one or more local cluster models failing to incorporate, after the updating based on received information, all of the one or more anomaly patterns to the one or more local cluster models within the complexity constraints, forwarding at least the one or more local cluster models and the one or more diagnosis labels associated with the one or more local cluster models again to the central diagnosis system for further diagnosis.

7. The local diagnosis system according to claim 1, wherein the at least one memory and the computer program code are configured, with the at least one processor, to cause the local diagnosis system to perform after the forwarding:

in response to receiving, from the central diagnosis system, one or more central cluster models, one or more central diagnosis labels corresponding to the one or more central cluster models and one or more central outlier anomaly patterns excluded from the one or more central cluster models, updating the one or more local cluster models based on the one or more central cluster models and the one or more diagnosis labels corresponding to the one or more central cluster models while attempting to incorporate the one or more outlier anomaly patterns excluded from the one or more central cluster models to the one or more local cluster models; and in response to failing to incorporate, after the updating of the one or more local cluster models based on received information, all of the one or more anomaly patterns to the one or more local cluster models within the complexity constraints, forwarding the one or more local cluster models, the one or more diagnosis labels associated with the one or more local cluster models and one or more outlier anomaly patterns excluded from the one or more local cluster models again to the central diagnosis system for further diagnosis.

8. The local diagnosis system according to claim 1, wherein the incorporating of the one or more anomaly patterns to the one or more local cluster models within the complexity constraints is deemed a failure according to the one or more pre-defined criteria if one or more outlier anomaly patterns of the one or more anomaly patterns were excluded, in the updating, from the one or more local cluster models to satisfy the complexity constraints and/or if a pre-defined threshold for a confidence metric indicating confidence in the one or more local cluster models predicting the one or more anomaly patterns is not reached.

9. The local diagnosis system according to claim 1, wherein the updating of the one or more local cluster models comprises:

performing initial updating of the one or more local cluster models to incorporate the one or more anomaly patterns within the complexity constraints without modifying the number of the one or more local cluster models;

calculating a value for a confidence metric indicating confidence in the one or more local cluster models predicting the one or more anomaly patterns, wherein the confidence metric is defined to increase with an increase in goodness of fit and with a decrease in clustering model complexity; and in response to determining that splitting at least one local cluster model causes an increase in the confidence metric, splitting each of said at least one local cluster model to two local cluster models; and/or in response to determining that merging at least one set of at least two local cluster models causes an increase in the confidence metric, merging each of said at least one set of at least two local cluster models to a single local cluster model; and/or in response to determining that removing at least one local cluster model causes an increase in the confidence metric, removing said least one local cluster model; and/or in response to determining that adding at least one local cluster model causes an increase in the confidence metric, adding said least one local cluster model.

10. The local diagnosis system according to claim 1, wherein each cluster model comprises information on the number of anomaly patterns associated with said cluster model and/or on a distribution of one or more anomaly patterns associated with said cluster model in the performance indicator space.

11. A central diagnosis system comprising:

at least one processor; and at least one memory including computer program code; the at least one memory and the computer program code configured, with the at least one processor, to cause the central diagnosis system at least to perform: receiving, from a local diagnosis system, information at least on one or more local cluster models describing one or more clusters and one or more diagnosis labels corresponding to the one or more local cluster models, wherein each of the one or more local cluster models corresponds to a different cluster, a cluster being a data structure comprising a plurality of data points in a performance indicator space defined by a plurality of performance indicators of a communications network; and updating one or more central cluster models based on the received information to incorporate the one or more local cluster models to the one or more central cluster models within complexity constraints of the one or more central cluster models, wherein each of one or more central cluster models is associated with a diagnosis label, wherein the complexity constraints of the one or more central cluster models are evaluated based on a number of the one or more central cluster models and a complexity of each of the one or more central cluster models, while attempting to incorporate the one or more outlier anomaly patterns excluded from the one or more central cluster models to the one or more local cluster models, and in response to failing according to one or more pre-defined criteria to incorporate, in the updating, the one or more anomaly patterns to the one or more local cluster models within the complexity constraints based on received information, all of the one or more anomaly patterns to the one or more local cluster models within the complexity constraints, forwarding at least the one or more local cluster models and one or more diagnosis labels associated with the one or more local cluster models to a central diagnosis system for further diagnosis.

12. The central diagnosis system according to claim 11, wherein the at least one memory and the computer program code are configured, with the at least one processor, to cause the central diagnosis system to perform:

maintaining, in a central diagnosis database, at least the one or more central cluster models of different clusters and the one or more diagnosis labels associated with the one or more central cluster models; and
storing the one or more central cluster models after the updating to the central diagnosis database.

13. The central diagnosis system according to claim 11, wherein the at least one memory and the computer program code are configured, with the at least one processor, to cause the central diagnosis system to perform:
maintaining, in a central anomaly event database, information on a plurality of anomaly events defining a plurality of anomaly patterns collected from one or more local diagnosis systems, wherein each anomaly pattern describes a data point in a performance indicator space defined by a plurality of performance indicators of a communications network and being based on a time-wise aggregation of values of the plurality of performance indicators during an anomaly event; and
in response to receiving information on one or more anomaly patterns from the local diagnosis system, storing at least one of the one or more anomaly patterns to the central anomaly event database.

14. The central diagnosis system according to claim 13, wherein the at least one memory and the computer program code are configured, with the at least one processor, to cause the central diagnosis system, in response to the received information further comprising information on one or more outlier anomaly patterns defining one or more data points in the performance indicator space excluded from the one or more local cluster models, to perform the updating by:
mixing the one or more outlier anomaly patterns with one or more anomaly patterns sampled from the plurality of anomaly patterns maintained in the central anomaly event database to produce a sample set of anomaly patterns; and
updating one or more central cluster models based on the one or more local cluster models, the one or more corresponding diagnosis labels and the sample set of anomaly patterns to incorporate the one or more local cluster models and the one or more outlier anomaly patterns to the one or more central cluster models within the complexity constraints.

15. The central diagnosis system according to claim 11, wherein the at least one memory and the computer program code are configured, with the at least one processor, to cause the central diagnosis system, in response to the received information further comprising information on one or more outlier anomaly patterns defining one or more data points in the performance indicator space excluded from the one or more local cluster models, to perform:
in response to at least one of the one or more outlier anomaly patterns being excluded in the updating from the one or more central cluster models to satisfy the complexity constraints, forwarding the one or more central cluster models, one or more diagnosis labels associated with the one or more central cluster models and said at least one of the one or more outlier anomaly patterns to the local diagnosis system for further diagnosis.

16. The central diagnosis system according to claim 11, wherein the at least one memory and the computer program code are configured, with the at least one processor, to cause the central diagnosis system, in response to the received information further comprising information on one or more outlier anomaly patterns defining one or more data points in the performance indicator space excluded from the one or more local cluster models, to perform:
in response to none of the one or more outlier anomaly patterns being excluded in the updating from the one or more central cluster models to satisfy the complexity constraints, forwarding the one or more central cluster models and the one or more diagnosis labels associated with the one or more central cluster models to the local diagnosis system for further diagnosis.

17. The central diagnosis system according to claim 11, wherein the at least one memory and the computer program code are configured, with the at least one processor, to cause the central diagnosis system, in response to the received information further comprising information on one or more outlier anomaly patterns, to perform the updating of the one or more central cluster models by:
performing initial updating of the one or more central cluster models to incorporate the one or more anomaly patterns within the complexity constraints without modifying the number of the one or more central cluster models;
calculating a value for a confidence metric indicating confidence in the one or more central cluster models predicting the one or more local cluster models and the one or more outlier anomaly patterns, wherein the confidence metric is defined to increase with an increase in goodness of fit and with a decrease in clustering model complexity; and
in response to determining that splitting at least one central cluster model causes an increase in the confidence metric, splitting each of said at least one central cluster model to two central cluster models; and/or
in response to determining that merging at least one set of at least two central cluster models causes an increase in the confidence metric, merging each of said at least one set of at least two central cluster models to a single central cluster model; and/or
in response to determining that removing at least one central cluster model causes an increase in the confidence metric, removing said least one central cluster model; and/or
in response to determining that adding at least one central cluster model causes an increase in the confidence metric, adding said least one central cluster model.

18. A method comprising: detecting one or more anomaly events associated with a communications network, wherein each anomaly event defines an anomaly pattern, each anomaly pattern describing a data point in a performance indicator space defined by a plurality of performance indicators of the communications network and being based on a time-wise aggregation of values of the plurality of performance indicators during an anomaly event; updating one or more local cluster models to incorporate the one or more anomaly patterns within complexity constraints of the one or more local cluster models, wherein each of the one or more local cluster models corresponds to a different cluster and to a different diagnosis label defining a diagnosis, a cluster being a data structure comprising a plurality of data points in the performance indicator space, wherein the complexity constraints of the one or more local cluster models are evaluated based on a number of the one or more local cluster models and/or the complexity of each of the one or more local cluster models while attempting to incorporate the one or more outlier anomaly patterns excluded from the one or more central cluster models to the one or more local cluster models; and in response to failing according to one or more pre-defined criteria to incorporate, in the updating, the one or more anomaly patterns to the one or more local cluster models within the complexity constraints based on received information, all of the one or more anomaly patterns to the one or more local cluster models within the complexity constraints, forwarding at least the one or more local cluster models and one or more diagnosis labels associated with the one or more local cluster models to a central diagnosis system for further diagnosis.

* * * * *